United States Patent [19]

Wakimoto

[11] Patent Number: 5,128,940
[45] Date of Patent: Jul. 7, 1992

[54] DEMULTIPLEXER

[75] Inventor: Hirotsugu Wakimoto, Yokohama, Japan

[73] Assignee: Kabushiki Kaisha Toshiba, Kawasaki, Japan

[21] Appl. No.: 580,870

[22] Filed: Sep. 11, 1990

[30] Foreign Application Priority Data

Sep. 11, 1989 [JP] Japan .................. 1-232902

[51] Int. Cl.⁵ .............................. H04J 3/04
[52] U.S. Cl. ...................... 370/112; 307/244; 328/105; 328/153
[58] Field of Search ............... 370/112; 307/241, 242, 307/243, 244; 328/104, 105, 106, 152, 153, 154

[56] References Cited

U.S. PATENT DOCUMENTS

4,593,390  6/1986  Hildebrand et al. ............... 370/112
4,926,423  5/1990  Zukowski ......................... 370/112

OTHER PUBLICATIONS

1988 Symposium on VLSI Circuits-Digest of Technical Papers/pp. 87-88 "A 4Gb/s GaAs 16-1 Multiplexer/1-16 Demultiplexer LSI" M. Ida et al; 1988.
GaAs IC Symposium, Technical Digest 1989 pp. 317-320 "12Gbps GaAs 2-bit Multiplexer/Demultiplexer Chip Set for the Sonet STS-192 System" K. Ishida H. Wakimoto et al.

Primary Examiner—Douglas W. Olms
Assistant Examiner—Wellington Chin
Attorney, Agent, or Firm—Oblon, Spivak, McClelland, Maier & Neustadt

[57] ABSTRACT

A demultiplexer has a main circuit section obtained by connecting a plurality of 1:2 demultiplexers, each for distributing a time-divisionally multiplexed signal into tow parts, to form a tree-like arrangement, and a clock frequency divider for frequency-dividing an input clock signal to generate frequency-divided signals to be supplied to the 1:2 demultiplexers of the respective stages of the tree-like arrangement. The demultiplexer has a plurality of inverting circuits for arbitrarily inverting the frequency-divided clock signals supplied from the clock frequency divider to the respective stages of the main circuit section in units of stages.

9 Claims, 7 Drawing Sheets

SERIAL DATA STRING
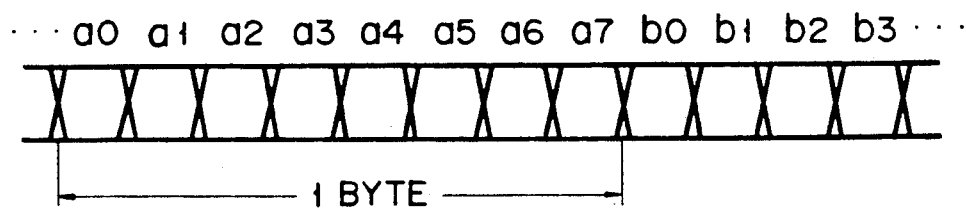
FIG. 2 (PRIOR ART)
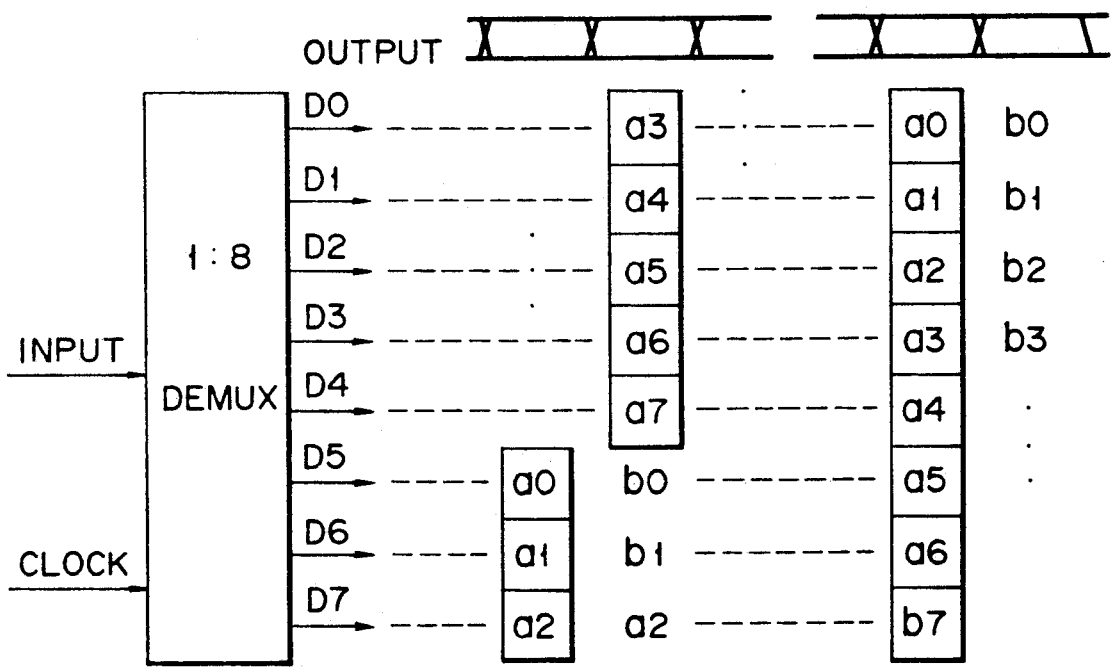
FIG. 3A
(PRIOR ART)
FIG. 3B
(PRIOR ART)
FIG. 3C
(PRIOR ART)

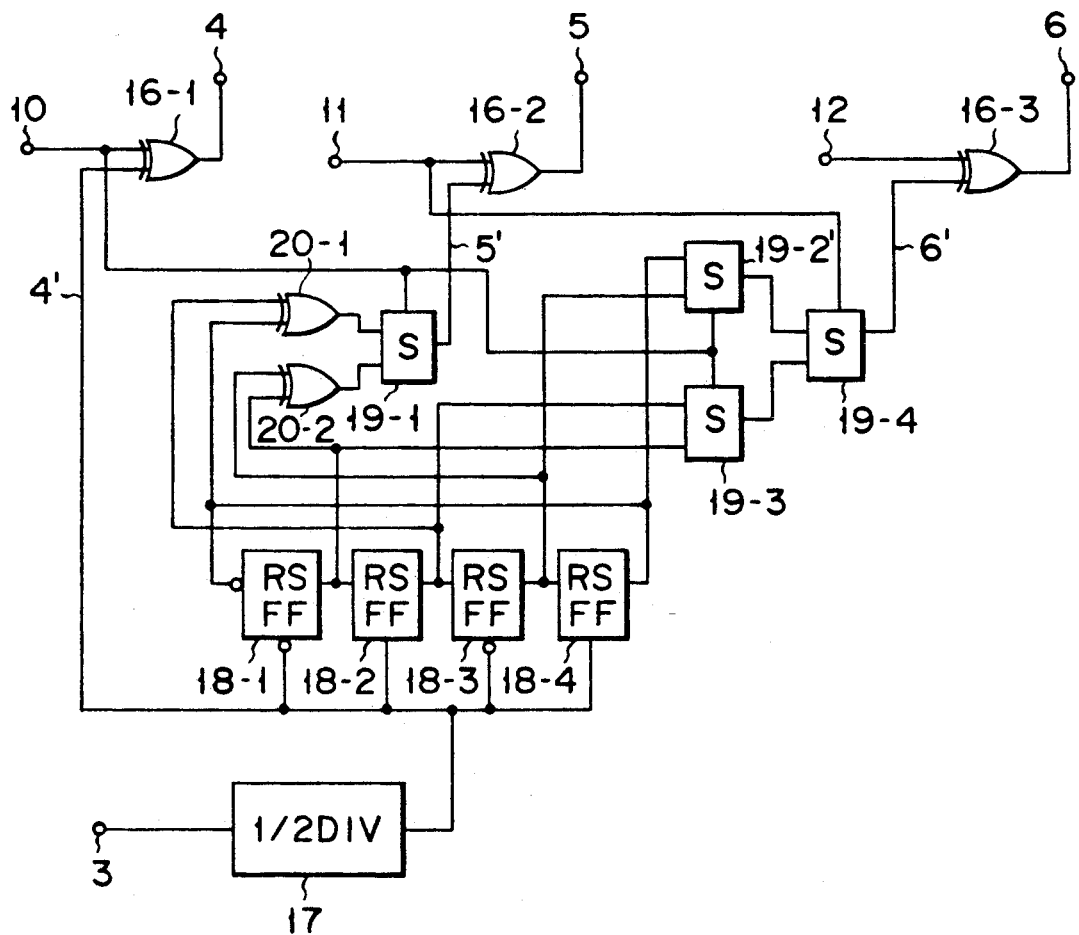
F I G. 11

DEMULTIPLEXER

BACKGROUND OF THE INVENTION

1. Field of the Invention

The present invention relates to a demultiplexer having a synchronization adjusting function used to separate a multiplexed signal in a communication system for processing a multiplexed high-speed signal, such as an optical communication system.

2. Description of the Related Art

In recent years, as an information amount is increased, a high-density information system such as an optical fiber communication system has been invented and put into practical use. In such a system, since a large amount of information can be transmitted even by a single signal line per unit time, signals of some media such as signals of an image and computer data are time-divisionally multiplexed. Therefore, a multiplexer for time-divisionally multiplexing data and a demultiplexer for demultiplexing and distributing the multiplexed data in accordance with its original data format serve as key devices. The multiplexer and the demultiplexer have been developed to increase their operation speeds, and a problem of matching with a communication system has been posed.

An example of a conventional demultiplexer is described in 1988 Symposium on VLSI Circuits, Digest of Technical Papers, pp. 87-88, "A 4 Gb/s GaAs 16-1 Multiplexer/1-16 Demultiplexer LSI", M. Ida et al., 1988.

The demultiplexer described in this document is a 1:16 demultiplexer constituted by combining 1:2 demultiplexers each having a D flip-flop (DFF) and a tri-stage flip-flop (TS-FF) like a tree.

A general example of the DFF is an MS (master-slave) type DFF in which two R-S (reset-set) flip-flops (RS-FF) serve as a master stage and a slave stage, respectively. The TS-FF is an $MS_1S_2$ type flip-flop obtained by adding another slave stage to the above MS (master-slave) type flip-flop. Although an input timing of this TS-FF is the same as that of the DFF, its output timing is shifted from a clock (CK) signal by a half period.

The above demultiplexer is obtained by connecting, like a tree, a plurality of 1:2 demultiplexers (branched at a ratio of 1:2 in units of stages) in which a pair of a DFF and a TS-FF are connected to receive an input signal in common so as to be expanded to be 1:16.

In order to process a high-speed signal, the number of processing sections where the signal having the highest speed is processed is preferably reduced as small as possible to obtain a stable operation. This is important especially to reduce manufacturing cost and the size of a device by using an IC arrangement. For this purpose, a circuit arrangement described here is suitable.

In a 1:2 demultiplexer as a basic element, a ½ CK signal obtained by frequency-dividing a CK signal corresponding to a input data signal by ½ is supplied to a TS-FF and a DFF, and the TS-FF and the DFF separate the data signals into two parts by independently performing latching at the rising and falling edges of the ½ CK signal.

FIG. 1 is a timing chart showing the basic 1:2 demultiplexer. Referring to FIG. 1, the TS-FF fetches a data string of (a, c, e, . . . ) since it latches an input signal consisting of a data string of (a, b, c, d, e, f, . . . ) at the rising (or leading) edge of a ½ CK. The DFF fetches a data string of (b, d, f, . . . ) since it latches the input signal at the falling (or trailing) edge of the ½ CK. Since an output from the TS-FF is delayed from the data fetching time by a half period, output timings of the TS-FF and the DFF are matched with each other. This is an operation of the basic 1:2 demultiplexer.

In a 1:16 demultiplexer in which the above 1:2 demultiplexers are expanded like a tree, data is changed at the same timing on all signal lines with respect to a plurality of input signals in stages from, e.g., the second stage. Therefore, a demultiplexing operation can be performed by a common ¼ CK signal (obtained by frequency-dividing the ½ CK signal by ½), a common ⅛ CK signal (obtained by frequency-dividing the ¼ CK signal by ½), and a common 1/16 CK signal (obtained by frequency-dividing the ⅛ CK signal by ½). A counter for frequency-dividing the CK signal outputs a output signal of one system for each of the ½, ¼, ⅛, and 1/16 CK signals. Timings of the ½, ¼, ⅛, and 1/16 CK signals must be adjusted in accordance with a delay time of a demultiplexer section as a main circuit to obtain an optimal operation. Separated data is sequentially output to each output signal terminal in accordance with the data order of an input signal data string.

A demultiplexer is a device for repeatedly performing an operation of determining a predetermined number of frames for data signals which are serial sequentially transmitted and distributing the data signals in the frames to different output terminals, thereby separating the data.

Signals to be transmitted in a high-density transmission system such as an optical communication system are a data string to be transmitted and a sync CK signal. When a signal is time-divisionally multiplexed, a signal at the start timing of a multiplexing frame is not transmitted, but a data signal having a predetermined pattern is transmitted. This pattern is checked to determine and correct the position of the multiplexing frame. This frame position is determined in accordance with a frequency-divided signal of a CK signal formed by the counter in the demultiplexer described above. For example, in the above-mentioned 1:16 demultiplexer, 16 types of uncertainty are present in a phase relationship between frequency-divided signals of sync CK signals and data signals. In a 1:8 demultiplexer, 8 types of uncertainty are present in a phase relationship between frequency-divided signals of sync CK signals and data signals.

As shown in FIG. 2, for example, assume that data of one byte ($a_0$ to $a_7$, $b_0$ . . . ) is to be serially transmitted and parallel-converted (this operation is a kind of simple demultiplexing).

When data of one byte ($a_0$ to $a_7$, $b_0$ . . . ) and a sync CK signal (bit sync signal) are simply input to a 1:8 demultiplexer (DEMUX), the data $a_0$ to $a_7$ are not always correctly output to output terminals $D_0$ to $D_7$. For example, as shown in FIG. 3B, the data $a_0$ to $a_2$ are output from the output terminals $D_5$ to $D_7$ at a certain timing, and the data $a_3$ to $a_7$ are output from the output terminals $D_0$ to $D_4$ at the next timing. In order to permit the output data to have significance in a system, the uncertainty mentioned above has to be eliminated. For this elimination, the relationships between the bits $a_0$ to $a_7$ of the data and the output terminals $D_0$ to $D_7$ must be predetermined, and the bits $a_0$ to $a_7$ of the data must be simultaneously output to the output terminals $D_0$ to $D_7$.

To process data in this manner is referred to as frame synchronization.

In general, no countermeasure against this bit shift caused by uncertainty is available in an initial period of signal input, and the uncertainty remains the same. Therefore, a system must transmit an identification signal and perform correction when it determines the magnitude of a bit shift. However, such a correction method is not currently established. Simple possible methods are a method of skipping a CK signal by an arbitrary number of bits and a method of connecting an 8×8 matrix selector to the output terminals, thereby switching the output terminals by this selector. In the latter method using the selector, however, a system arrangement is too complicated. The former method of skipping a CK signal cannot satisfactorily cope with a high operation speed. In particular, at a frequency close to the limit of an operation speed of a DFF operation, it is very difficult to properly skip the CK signal by the above method. Therefore, the above method cannot be put into practical use under the present condition. Therefore, a demand has arisen for a method capable of outputting a signal distributed by a demultiplexer from predetermined output terminals by using a simple arrangement.

In recent years, a movement of international standardization of optical communication networks has progressed. Of the optical communication networks, an STS (Synchronous Transportation System) of a Synchronous Optical Network (SONET) is expected to be promising. In this network, since data is transmitted in unit of 8 bits, not one-bit multiplexing but 8-bit multiplexing must be performed. Since signal processing is performed after a signal is distributed into 8 bits in this network, a 1:8 demultiplexer is required. In the STS system, since the contents of data are changed when a bit shift occurs, frame synchronization must be reliably taken with respect to a data signal string. In frame synchronization, it is important to output 8 bits of a signal at the same timing to predetermined output terminals.

As is apparent from FIG. 3B described above, in the above-mentioned method of switching output signals, even though signals can be output to predetermined output terminals, a timing of some of the 8 bits is shifted, and a series of 8-bit signals are divisionally output twice.

That is, a high-speed multiplexer must transmit separated output signals to correct output terminals required by a system and perform frame synchronization at the same timing when a system is directed to the above STS system.

SUMMARY OF THE INVENTION

It is an object of the present invention to provide a demultiplexer which can correctly output output signals obtained by demultiplexing a multiplexed signal to predetermined output terminals and has a simple arrangement.

It is another object of the present invention to provide a demultiplexer which can correctly output output signals obtained by demultiplexing a multiplexed signal at the same timing to predetermined output terminals.

A demultiplexer of the present invention comprises a demultiplexer having a main circuit obtained by combining N 1:2 demultiplexers like a tree and a clock frequency divider for frequency-dividing a sync clock signal by $\frac{1}{2^N}$ and supplying the $\frac{1}{2^N}$-frequency-divided signal to a 1:2 demultiplexer in the Nth stage of the above tree, wherein an inverting circuit for inverting a logic level as needed is added to the $\frac{1}{2^N}$-frequency-divided signal to be supplied to each stage of the tree.

The above inverting circuit can be realized by only inserting an exclusive OR gate into a supply system of a frequency-divided clock signal.

According to the demultiplexer of the present invention, correction of a bit shift is performed by allowing one of the N inverting circuits to be effective. In the $1:2^N$ demultiplexer, $2^N$ types of bit shift uncertainty are present, and these types of uncertainty are always corrected by operations of the N inverting circuits. Therefore, a shift between the output terminals can be corrected to correctly output signals to predetermined output terminals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a schematic view showing a practical serial data string;

FIGS. 3A to 3C are views for explaining a problem posed in a conventional demultiplexer;

FIG. 11 is a block diagram showing a practical arrangement of a clock frequency divider according to the third embodiment of the present invention.

DETAILED DESCRIPTION OF THE PREFERRED EMBODIMENT

Figure 1:
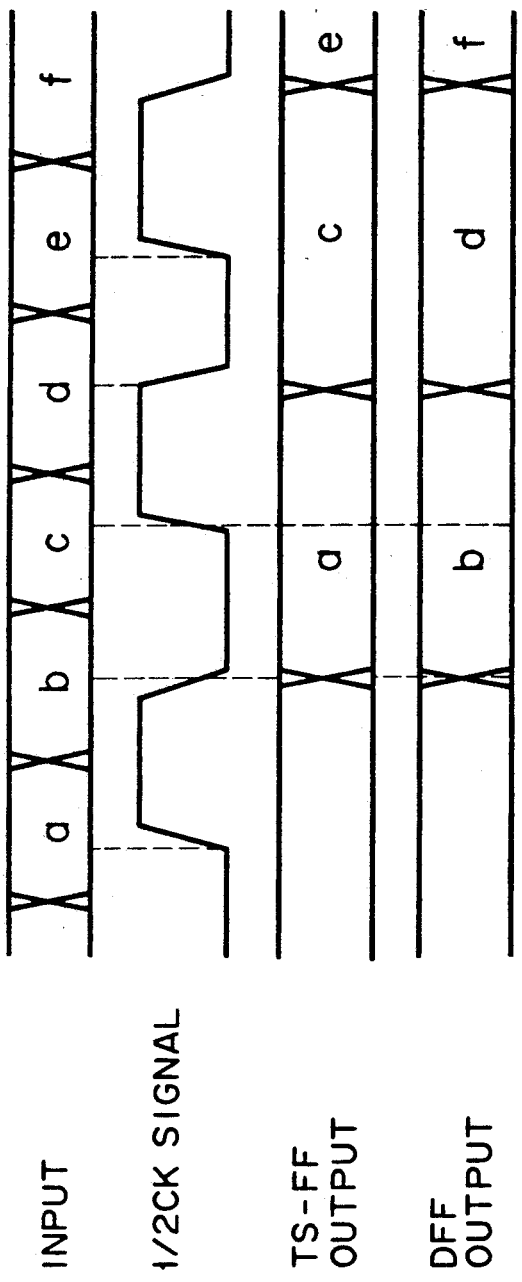
FIG. 1 is a timing chart for explaining the principle of a conventional demultiplexer.
Figure 4:
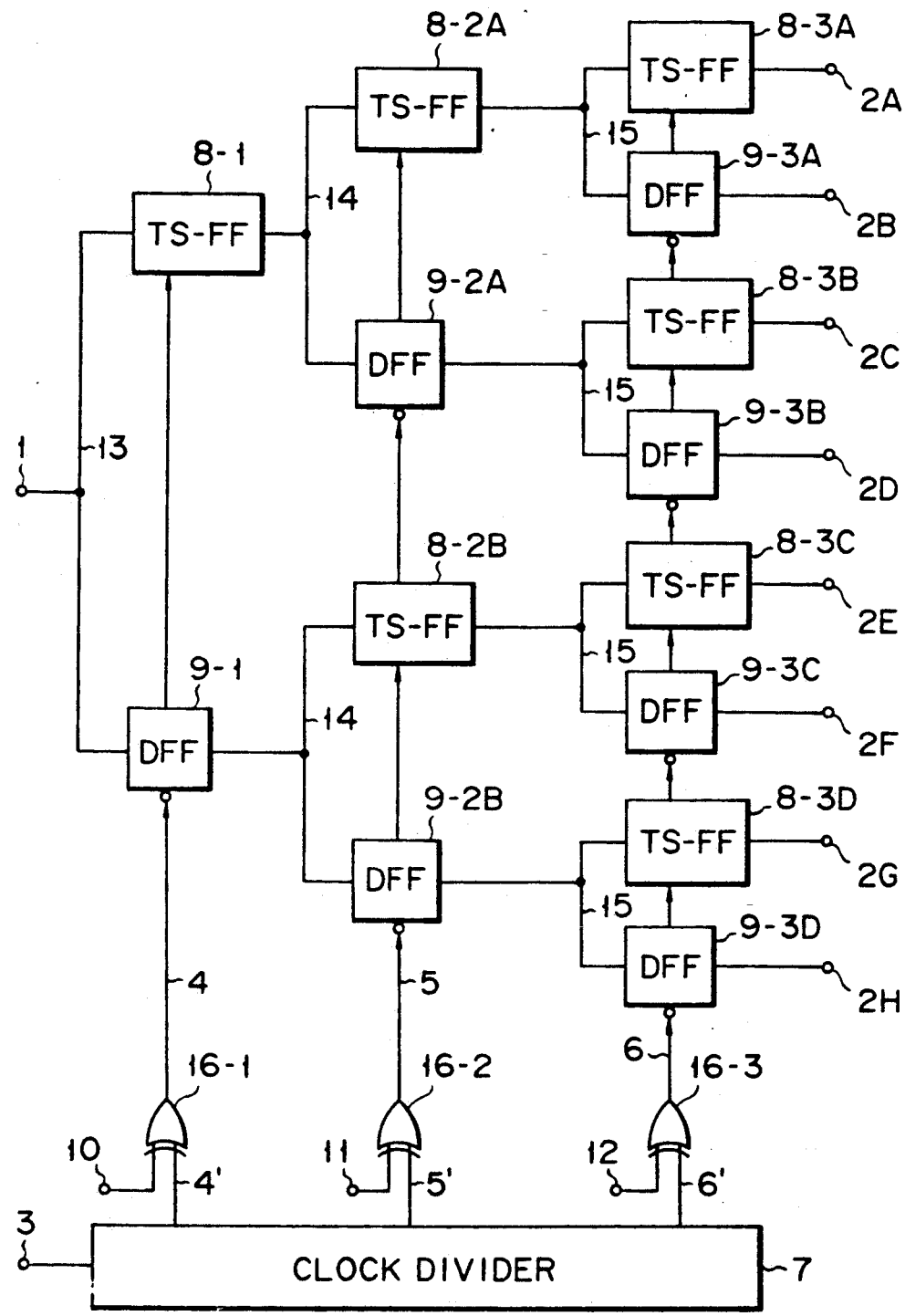
FIG. 4 is a block diagram showing an arrangement of a demultiplexer according to the first embodiment of the present invention.

FIG. 4 shows an arrangement of a demultiplexer according to the first embodiment of the present invention. The demultiplexer shown in FIG. 4 is arranged as a 1:8 demultiplexer.

Referring to FIG. 4, a signal 13 input from a data signal input terminal 1 is supplied to a tri-stage flip-flop (TS-FF) 8-1 and a D flip-flop (DFF) 9-1 constituting a 1:2 demultiplexer in the first stage. Signals 14A and 14B output from the TS-FF 8-1 and the DFF 9-1 are supplied to a TS-FF 8-2A and a DFF 9-2A, and a TS-FF 8-2B and a DFF 9-2B, respectively, constituting a 1:2 demultiplexer in the next stage. Signals 15A and 15B output from the TS-FF 8-2A and the DFF 9-2A are supplied to a TS-FF 8-3A and a DFF 9-3A, and a TS-FF 8-3B and a DFF 9-3B, respectively, constituting a 1:2 demultiplexer in the next stage Signals 15C and 15D output from the TS-FF 8-2B and the DFF 9-2B are supplied to a TS-FF 8-3C and a DFF 9-3C, and a TS-FF 8-3D and a DFF 9-3D, respectively, constituting a 1:2 demultiplexer in the next stage. Outputs from the TS-FF 8-3A, the DFF 9-3A, the TS-FF 8-3B, the DFF 9-3B, the TS-FF 8-2B, the DFF 9-2B, the TS-FF 8-3C, the DFF 9-3C, the TS-FF 8-3D, and the DFF 9-3D are supplied to data signal output terminals 2A, 2B, 2C, 2D, 2E, 2F, 2G, and 2H, respectively. A main circuit of the demultiplexer has the above arrangement.

A clock (CK) signal supplied to a clock signal input terminal 3 is frequency-divided by $\frac{1}{2}$, $\frac{1}{4}$, and $\frac{1}{8}$ by a clock frequency divider 7 and output as CK signals 4', 5', and 6' having frequencies of $\frac{1}{2}$, $\frac{1}{4}$, and $\frac{1}{8}$, respectively. Each of these CK signals 4', 5', and 6' is input to one input terminal of a corresponding one of exclusive OR gates (EX-ORs) 16-1 to 16-3. The other input terminal of each of the EX-ORs 16-1 to 16-3 receives a corresponding one of control signals supplied from control signal input terminals 10, 11, and 12. An output from the EX-OR 16-1 is supplied as a $\frac{1}{2}$ CK signal 4 to the TS-FF 8-1 and the DFF 9-1 in the first stage, an output from the EX-OR 16-2 is supplied as a $\frac{1}{4}$ CK signal 5 to the TS-FFs 8-2A and 8-2B and the DFFs 9-2A and 9-2B in the second stage, and an output from the EX-OR 16-3 is supplied as a $\frac{1}{8}$ CK signal 6 to the TS-FFs 8-3A, 8-3B, 8-3C, and 8-3D and the DFFs 9-3A, 9-3B, 9-3C, and 9-3D in the third stage. In this case, the TS-FFs 8-1, 8-2A, 8-2B, 8-3A, 8-3B, 8-3C, and 8-3D latch an input signal at the rising edges of the CK signals 4, 5, and 6, and the DFFs 9-1, 9-2A, 9-2B, 9-3A, 9-3B, 9-3C, and 9-3D latch an input signal at the falling edges of the CK signals 4, 5, and 6.

The EX-ORs 16-1 to 16-3 can invert the CK signals 4' to 6' output from the clock frequency divider 7 in accordance with control signals supplied as logic level "H" or "L" from terminals 10 to 12. That is, when the control signals supplied from the terminals 10 to 12 are at "L", the EX-ORs 16-1 to 16-3 directly output the CK signals 4' to 6' output from the clock frequency divider 7 as the CK signals 4 to 6, respectively. When the control signals are at "H", the EX-ORs 16-1 to 16-3 invert the CK signals 4' to 6' and output the inverted signals as the CK signals 4 to 6.

When the frequency-divided CK signal is inverted, in the main circuit, timings of the data signals on signal lines in stages subsequent to a stage to which the inverted CK signal is supplied, e.g., timings of the data signals 14A, 14B, 15A, 15B, 15C, and 15D are shifted. However, timings of the frequency-divided CK signals to be supplied to the subsequent stages are not changed. Therefore, a timing margin of FFs for use in a demultiplexer must be made wide.

Note that this problem can be solved by adding a circuit for shifting the timings of frequency-divided signals in the subsequent stages in accordance with inversion of the frequency-divided CK signal. In this case, the frequency divider must be separated from the circuit for shifting the timings so as not to cause skipping in the frequency divider due to a timing shifting operation.

An operation of changing the output position by inverting the frequency-divided CK signal will be described below.

Figure 5:
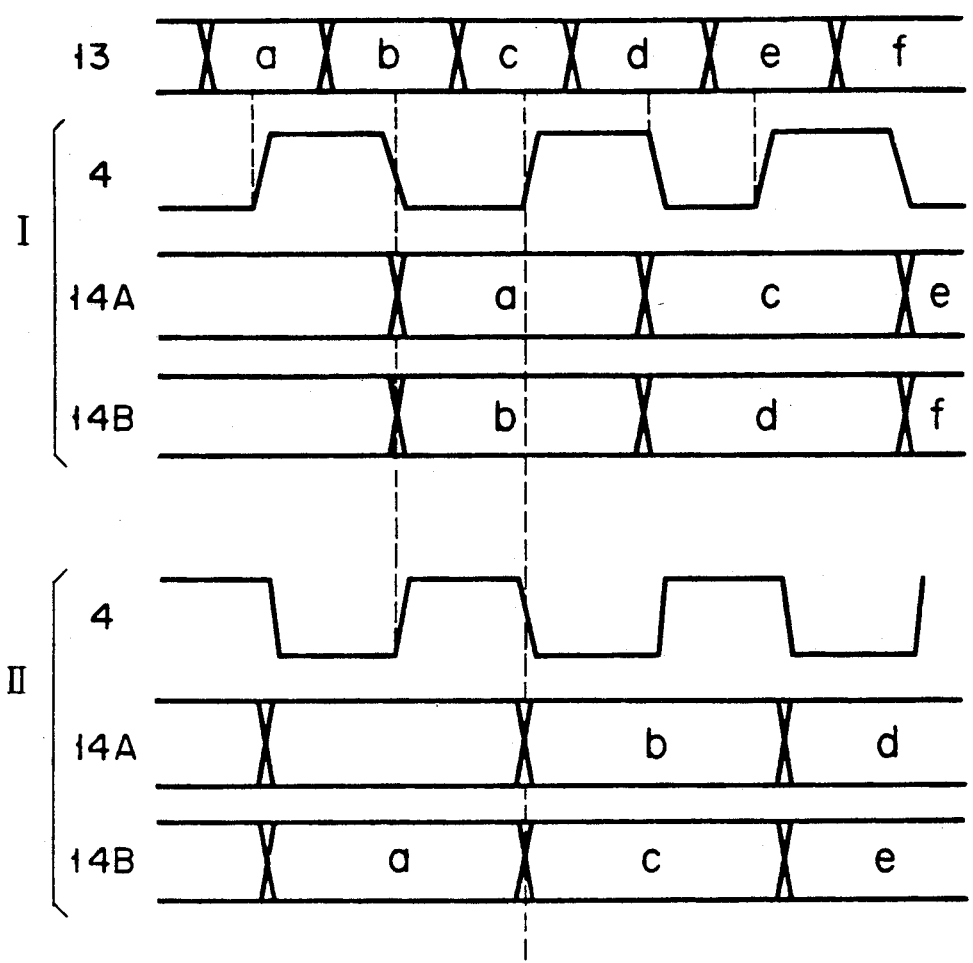
FIG. 5 is a timing chart for explaining an operation of the demultiplexer shown in FIG. 4.

FIG. 5 shows a timing chart of a simple 1:2 demultiplexer. Referring to FIG. 5, a portion I shows the output 14A from the TS-FF 8-1 and the output 14B from the DFF 8-1 obtained when the non-inverted $\frac{1}{2}$ CK signal 4 is supplied to the serial data string signal 13, and a portion II shows the output 14A from the TS-FF 8-1 and the output 14B from the DFF 8-1 obtained when the inverted $\frac{1}{2}$ CK signal 4 is supplied to the serial data string signal 13. In the case of I, a data string [a, c, e, . . . ] is output as the output 14A, and a data string [b, d, f, . . . ] is output as the output 14B. In the case of II, a data string [b, d, f, . . . ] is output as the output 14A, and a data string [a, c, e, . . . ] is output as the output 14B. In this manner, output terminals for outputting the data string are different between the cases I and II. This means that an output terminal can be correctly selected by selecting inversion of the CK signal.

In a 1:$2^N$ demultiplexer, this operation is repeatedly performed. Note that the first shifting of the output position is performed by inverting a $\frac{1}{2}$ CK signal in the first stage, and $2^{(i-1)}$ shifts are repeated by inverting a frequency-divided CK signal in the ith stage. Therefore, the position of an output signal can be shifted by an arbitrary number by operating N inverting circuits with respect to $2^N$ types of uncertainty.

Figure 6:
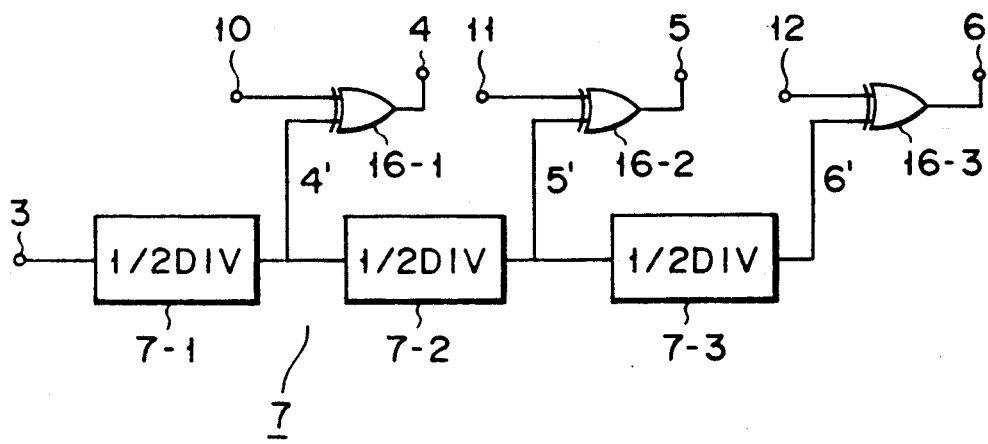
FIG. 6 is a block diagram showing a practical arrangement of a clock frequency divider in the embodiment shown in FIG. 4.

FIG. 6 shows a practical arrangement of the clock divider 7 according to this embodiment.

The clock divider 7 is constituted by connecting three $\frac{1}{2}$ dividers (to be referred to as "$\frac{1}{2}$ DIVs" hereinafter) 7-1, 7-2, and 7-3 and generates a $\frac{1}{2}$ CK signal 4', a $\frac{1}{4}$ CK signal 5', and a $\frac{1}{8}$ CK signal 6'.

As described above, the signals 4', 5', and 6' are supplied as the frequency-divided C outputs 4, 5, and 6 to the main circuit via the EX-ORs 16-1, 16-2, and 16-3, respectively. By arbitrarily selecting the control signal to be supplied to the terminals 10, 11, and 12, the CK signal can be inverted and a desired signal output terminal can be determined.

Figure 7:
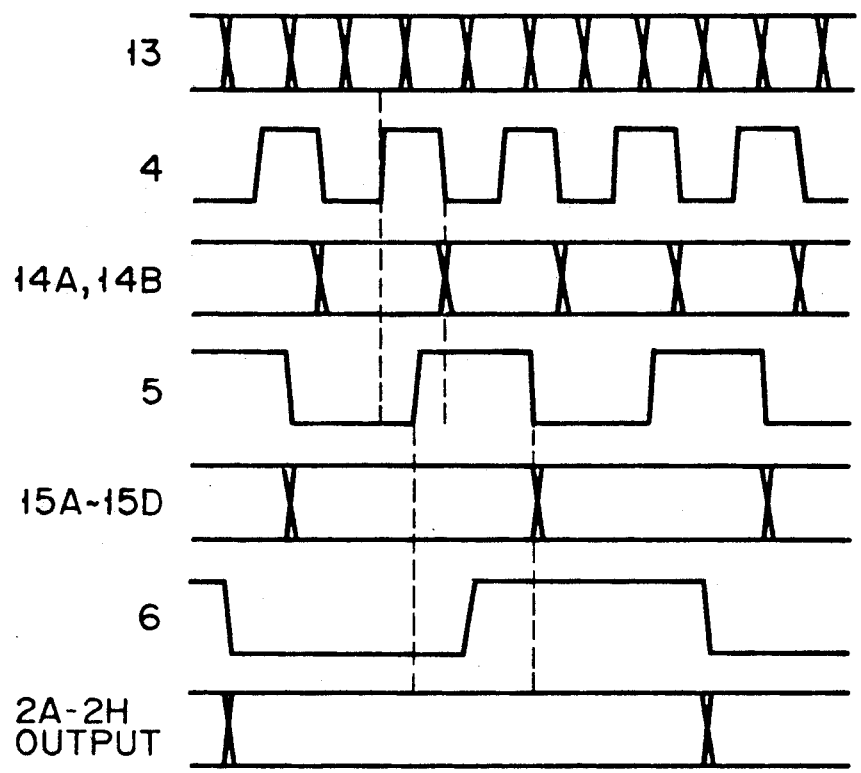
FIGS. 7, 8A, and 8B are timing charts for explaining operations of the circuits shown in FIGS. 4 and 6.

FIG. 7 shows a timing chart of a circuit using the clock divider 7 shown in FIG. 6.

Waveforms of the signals 13, 4 to 6, 14A, 14B, and 15A to 15D and the outputs from the terminals 2A to 2H are obtained when the three inversion control signals supplied to the terminals 10 to 12 are at level "L". In this case, a timing relationship between the $\frac{1}{2}$ CK signal 4, the $\frac{1}{4}$ CK signal 5, and the $\frac{1}{8}$ CK signal 6 is important. As shown in FIG. 5, the timing of the signals 14A and 14B is determined by the CK signal 4 and delayed by a half period upon inversion of the signal 4. In addition, referring to FIG. 5, the timing of data a is advanced while that of data b is delayed. As shown in FIG. 7, when the rising or falling edge of the CK signal 5 is present in the latter half of each data period of the signals 14A and 14B, a signal of the data b is output at the position of the data a before inversion in a system as a whole, and the output timing position is advanced by one data. When the rising or falling edge of the CK signal 5 is present in the first half of each data period of the signals 14A and 14B, the output timing position is delayed by one data.

Similarly, whether the output timing position is to be advanced or delayed by two is determined by a timing relationship between the signals 15A to 15D and the CK signal 6. In order to facilitate adjustment performed by the control signals supplied to the terminals 10 to 12, selection of the above timing relationship must be determined to on of "advance" and "delay". In addition, since an allowable range of the timing of the CK signal 5 or 6 is very narrow, a circuit device such as a DFF used to realize this range must operate at a high speed. As a result, an advantage of the tree-like arrangement of the 1:2 basic circuits is degraded, and a design margin of a circuit parameter such as a delay time is decreased. In this case, however, the circuit arrangement is advantageously simplified.

More specifically, assume that the present invention is applied to a 1:8 demultiplexer in an STS-192 system as a 10-Gbps band optical communication system. In this system, an input signal is of 10 Gbps, and a period is about 100 psec. As a circuit device, a source coupled FET logic (SCFL) using a MESFET (Metal Schottky Gate Field Effect Transistor) on a GaAs semiconductor is used.

Since this circuit can operate at a high speed and a vertically stacked arrangement based on a differential operation can be adopted, an EX-OR or a DFF can be easily realized by a simple circuit. During an operation of 10 Gbps, a variation in ¼ CK signal 5 is suppressed to be about 40 psec in consideration of rise and fall times. Timings of the CK signals 4 and 5 can be adjusted by adding a buffer circuit on a signal line of the CK signal 5 in consideration of variations in delay times of the flip-flops, i.e., the TS-FFs 8-1 to 8-3D and the DFFs 9-1 to 9-3D.

Figure 8A:
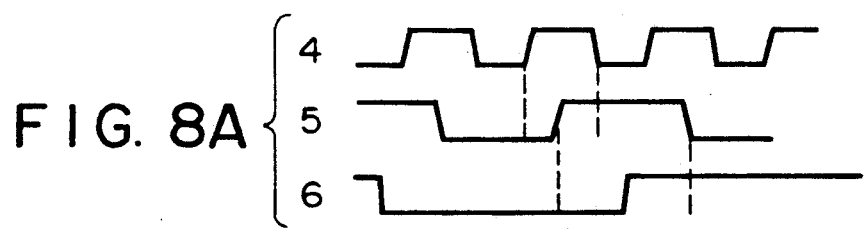
Figure 8B:
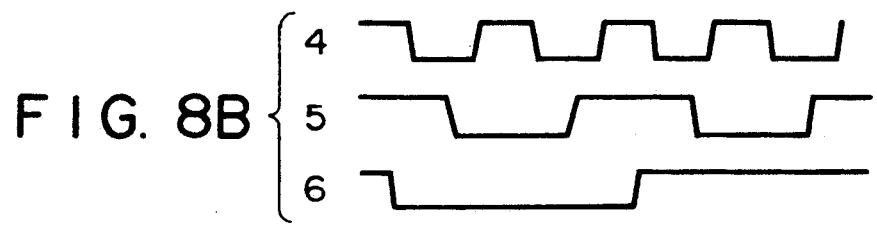

Such a buffer circuit is omitted from FIGS. 4 and 6. A delay time of a buffer of one stage measured by a circuit simulator (e.g., a so-called "SPICE") is 25 to 45 psec. This variation is caused by a difference between intermediate wiring capacitances. In an actual arrangement, if high-speed FFs are used, two stages of buffers are added to the signal path of the CK signal 5 to realize a delay time of 50 psec, and the variation can be suppressed to be 40 psec ($\pm$20 psec). FIGS. 8A and 8B show timing charts of the CK signals 4 to 6, in which FIG. 8A shows waveforms obtained when the control signal of the terminal 10 is at level "L" and FIG. 8B shows waveforms obtained when it is at level "H".

Figure 9:
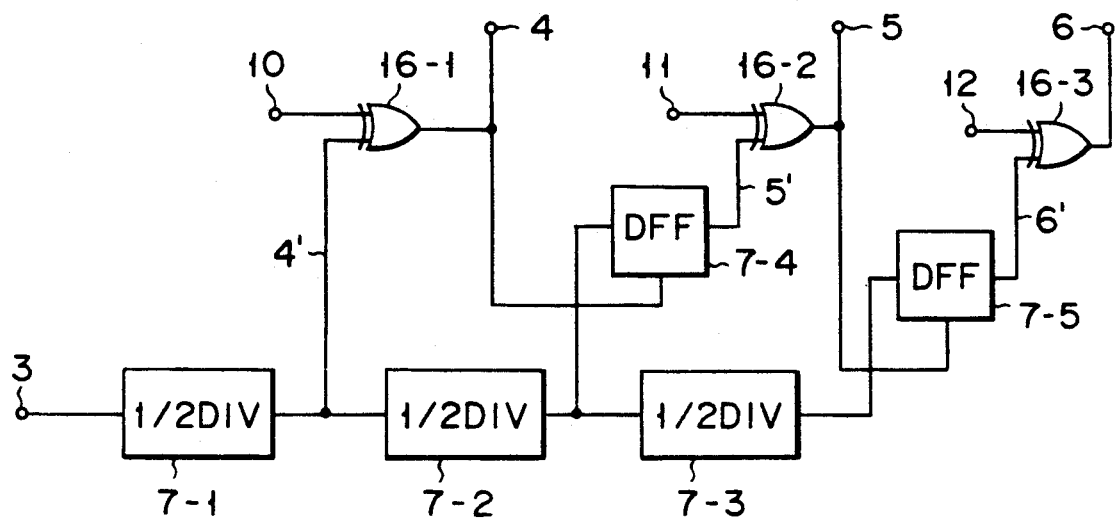
FIG. 9 is a block diagram showing a practical arrangement of a clock frequency divider according to the second embodiment of the present invention.

FIG. 9 shows a clock divider section according to the second embodiment of the present invention.

Devices mainly used in the circuit shown in FIG. 9 are similar to those used in the circuit shown in FIG. 6. In the circuit shown in FIG. 9, however, DFFs 7-4 and 7-5 are additionally provided to latch frequency-divided CK signals 5' and 6' by CK signals 4 and 5, respectively. The DFF 7-4 is connected between a ¼ DIV 7-2 and an EX-OR gate 16-2 for outputting the frequency-divided CK signal 5 in the second stage of the clock divider. The DFF 7-5 is connected between a ¼ DIV 7-3 and an EX-OR gate 16-3 for outputting the frequency-divided CK signal 6 in the third stage. The DFF 7-4 connected to the EX-OR gate 16-2 is operated by the frequency-divided CK signal 4, and the DFF 7-5 connected to the EX-OR gate 16-3 is operated by the frequency-divided CK signal 5.

In this circuit, output timings of the signals 5 and 6 are shifted by inversion operations performed by signals supplied to terminals 10 and 11.

Figure 10A:
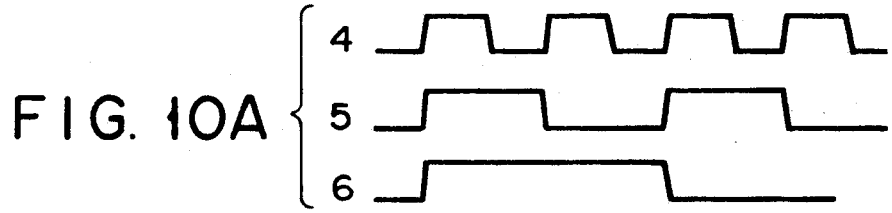
FIGS. 10A and 10B are timing charts for explaining an operation of the circuit shown in FIG. 9.
Figure 10B:
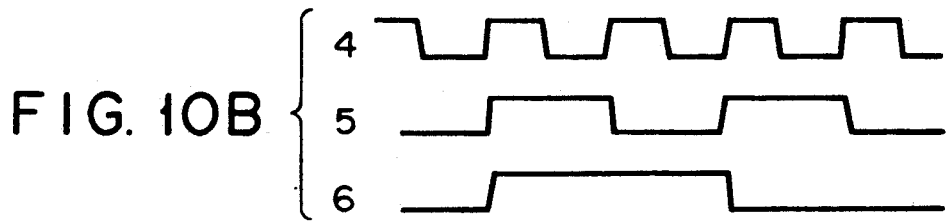

FIGS. 10A and 10B show output timings of the signals 4 to 6 in the circuit shown in FIG. 9, in which FIG. 10A shows waveforms obtained when all of input control signals to the terminals 10 to 12 are at level "L" and FIG. 10B shows only an input control signal to the terminal 10 is at level "H". As is apparent from comparison between FIGS. 10A and 10B, the timings of the signals 5 and 6 are shifted in accordance with inversion of the signal 4.

A timing margin of each FF of the main circuit is relaxed by the use of the above circuit. However, margins of the DFFs 7-4 and 7-5 used in this clock frequency divider must be correctly estimated. The margin is about the same as that of the circuit shown in FIG. 6, and the circuit shown in FIG. 9 can be realized by arbitrarily using a buffer circuit. As is apparent from this embodiment, inversion operations of the control signals from the terminals 10 to 12 have no influence on the three ¼ DIVs 7-1 to 7-3 for generating basic frequency-divided CK signals.

FIG. 11 shows a clock frequency divider section according to the third embodiment of the present invention.

This circuit comprises one ¼ DIV 17, four RS-FFs (reset-set-flip-flops) 18-1 to 18-4, four selectors (Ss) 19-1 to 19-4, and two EX-ORs 20-1 and 20-2. In this circuit, an output is supplied from the ¼ DIV 17, and the RS-FFs 18-1 to 18-4 frequency-divide the output by ¼, thereby obtaining ¼ CK signals having shifted timings. These signals are combined by the EX-ORs 20-1 and 20-2 to obtain two ¼ signals, and one of the ¼ signals is selected by the selector 19-1 to obtain a CK signal 5'. In addition, one of the ¼ CK signals having shifted timings output from the RS-FFs 18-1 to 18-4 is selected by the selectors 19-2 to 19-4 to obtain a CK signal 6'.

Similar to the circuit shown in FIG. 9, this circuit shifts the timings of the CK signals 5 and 6 by an inversion operation. In this case, an operation timing is the same as that of the circuit shown in FIG. 9, and the circuit operates in accordance with the timing charts shown in FIGS. 10A and 10B.

Unlike the circuit shown in FIG. 9, the circuit shown in FIG. 11 does not perform retiming operations, such as those performed by the DFFs 7-4 and 7-5, and no section having a strict timing margin is present except for the basic clock frequency divider. In addition, no section having a strict timing margin is present in a main circuit.

The circuit shown in FIG. 11 extracts a plurality of frequency-divided signals having different timings from the basic frequency divider and outputs a frequency-divided signal selected by the selectors 19-1 to 19-4 by using the inversion control signals from the terminals 10 to 12. In this circuit, a timing margin need not be strictly considered.

In the above embodiments, a MESFET consisting of GaAs is used as semiconductor elements constituting the circuit. However, an InP MISFET (metal insulator semiconductor FET) or a MOSFET consisting of an Si material may be used. In addition, the type of logic circuit is not limited to SCFL (source coupled FET logic) but may be DCFL (direct coupled FET logic) or SLCF logic (Schottky diode level shifter capacitor FET logic).

Note that the demultiplexer of the present invention can be formed in a single semiconductor substrate and therefore can be housed in a single semiconductor device.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A demultiplexer comprising:
   main circuit means obtained by connecting a plurality of stages of 1:2 demultiplexer means, each for distributing a time-divisionally multiplexed signals into two parts, to form a tree-like arrangement;
   clock frequency dividing means for frequency-dividing an input clock signal into a plurality of frequency-divided clock signals to be supplied to said 1:2 demultiplexer means in the respective stages of said tree-like arrangement of said main circuit means; and
   a plurality of inverting means for arbitrarily inverting the frequency-divided clock signals supplied from said clock frequency dividing means to the respective stages of said main circuit means in units of stages.

2. A demultiplexer according to claim 1, wherein each of said inverting means is an exclusive OR gate having a first input terminal for receiving a frequency-divided clock signal and a second input terminal for receiving an inversion control signal.

3. A demultiplexer according to claim 1, wherein said clock frequency dividing means comprises frequency-divided signal generating means for generating a frequency-divided signal on the basis of only the clock signal, and latching means for latching the frequency-divided signal from said frequency-divide signal generating means by a frequency-divided signal inverted by said inverting means in a stage immediately preceding said stage.

4. A demultiplexer according to claim 1, wherein said clock frequency dividing means comprises frequency-divided signal generating means for generating a plurality of frequency-divided signals having shifted timings on the basis of only the clock signal, and selector means for selecting an arbitrary signal from a plurality of frequency-divided signals having shifted timings generated by said frequency-divided signal generating means in accordance with the inversion control signal.

5. A demultiplexer comprising:
   main circuit means obtained by connecting a plurality of stages of 1:2 demultiplexer means, each constituted by a tri-stage flip-flop and a D flip flop, for distributing a time-divisionally multiplexed signal into two parts, to form a tree-like arrangement;
   clock frequency dividing mean for frequency-dividing an input clock signal to generate frequency-divided clock signals to be supplied to said 1:2 demultiplexer means in the respective stages of said tree-like arrangement of said main circuit means; and
   a plurality of inverting means for arbitrarily inverting the frequency-divided clock signals supplied from said clock frequency dividing means to the respective stages of said main circuit means.

6. A demultiplexer according to claim 5, wherein each of said inverting means is an exclusive OR gate having a first input terminal for receiving a frequency-divided clock signal and a second input terminal for receiving an inversion control signal.

7. A demultiplexer according to claim 5, wherein said clock frequency dividing means comprises frequency-divided signal generating means for generating a frequency-divided signal on the basis of only the clock signal, and latching means for latching the frequency-divided signal from said frequency-divided signal generating means by a frequency-divided signal inverted by said inverting means in a stage immediately preceding said stage.

8. A demultiplexer according to claim 5, wherein said clock frequency-dividing means comprises frequency-divided signal generating means for generating a plurality of frequency-divided signals having shifted timings on the basis of only the clock signal, and selector means for selecting an arbitrary signal of a plurality of frequency-divided signals having shifted timings generated by said frequency-divided signal generating means in accordance with the inversion control signal.

9. A demultiplexer comprising:
   main circuit means obtained by connecting a plurality of stages of 1:2 demultiplexer means, each for distributing a time-divisionally multiplexed signals into two parts, to form a tree-like arrangement;
   clock frequency dividing means, including a plurality of ½ frequency dividers coupled together in series, for frequency-dividing an input clock signal into a plurality of frequency-divided clock signals to be supplied to said 1:2 demultiplexer means in the respective stages of said tree-like arrangement of said main circuit means; and
   a plurality of inverting means for inverting the frequency-divided clock signals supplied from said clock frequency dividing means to the respective stages of said main circuit means in units of stages, each of said inverting means including an exclusive OR gate having a first input terminal for receiving a frequency-divided clock signal and a second input terminal for receiving an inversion control signal.

* * * * *